United States Patent [19]

Koppelman

[11] Patent Number: 4,728,339
[45] Date of Patent: Mar. 1, 1988

[54] MULTIPLE HEARTH APPARATUS AND PROCESS FOR THERMAL TREATMENT OF CARBONACEOUS MATERIALS

[75] Inventor: Edward Koppelman, Encino, Calif.

[73] Assignee: K-Fuel Partnership, Birmingham, Mich.

[21] Appl. No.: 930,929

[22] Filed: Nov. 17, 1986

Related U.S. Application Data

[63] Continuation-in-part of Ser. No. 683,591, Dec. 19, 1984, Pat. No. 4,626,258.

[51] Int. Cl.⁴ .................. F26B 17/12; C10L 9/08
[52] U.S. Cl. ......................................... 44/1 R; 44/2;
    44/29; 44/33; 422/142; 422/146
[58] Field of Search ................ 44/2, 1 R, 12, 29, 33;
    422/142, 146, 193, 216, 232

[56] References Cited

U.S. PATENT DOCUMENTS

| | | | |
|---|---|---|---|
| 3,968,756 | 7/1976 | Yamada | 110/12 |
| 4,046,086 | 9/1977 | Von Dreusche | 110/12 |
| 4,052,168 | 10/1977 | Koppelman | 44/1 G |
| 4,182,246 | 1/1980 | Lombana et al. | 110/188 |
| 4,248,164 | 2/1981 | Isheim | 110/225 |
| 4,254,643 | 5/1979 | Cook | 422/185 |
| 4,347,156 | 8/1982 | Lombana et al. | 110/225 |
| 4,371,375 | 2/1983 | Dennis, Jr. et al. | 44/2 |
| 4,391,208 | 7/1983 | Lewis | 110/346 |
| 4,398,476 | 8/1983 | Suzuki | 110/188 |
| 4,453,474 | 6/1984 | Lewis | 110/188 |

Primary Examiner—Carl F. Dees
Attorney, Agent, or Firm—Harness, Dickey & Pierce

[57] ABSTRACT

A multiple hearth apparatus and process for the thermal treatment of organic carbonaceous materials under controlled pressure and temperature comprising a pressure vessel containing a plurality of superimposed annular hearths including hearths in a reaction zone of the apparatus which are formed with a foraminous upper surface disposed in communication with a plenum for injecting a heated fluid into heat exchange contact with the feed material disposed thereon. The injected heating fluid or gas in further combination with the volatile gases evolved during the thermal restructuring reaction pass countercurrently relative to the travel of the feed material to effect a preheating thereof to a moderate temperature in a preheating zone of the apparatus. Preferably, at least a portion of the volatile gases from the apparatus are treated to remove condensible portions thereof and are reheated and pressurized for recycle to the apparatus. In operation, the apparatus is adapted to operate at temperatures ranging from about 200° F. up to about 1200° F. at pressures generally ranging from about 300 up to about 3000 psig. Resident times of as little as one minute up to about 1 hour can be employed which will vary depending upon the type of feed material and the desired upgraded solid product.

14 Claims, 5 Drawing Figures

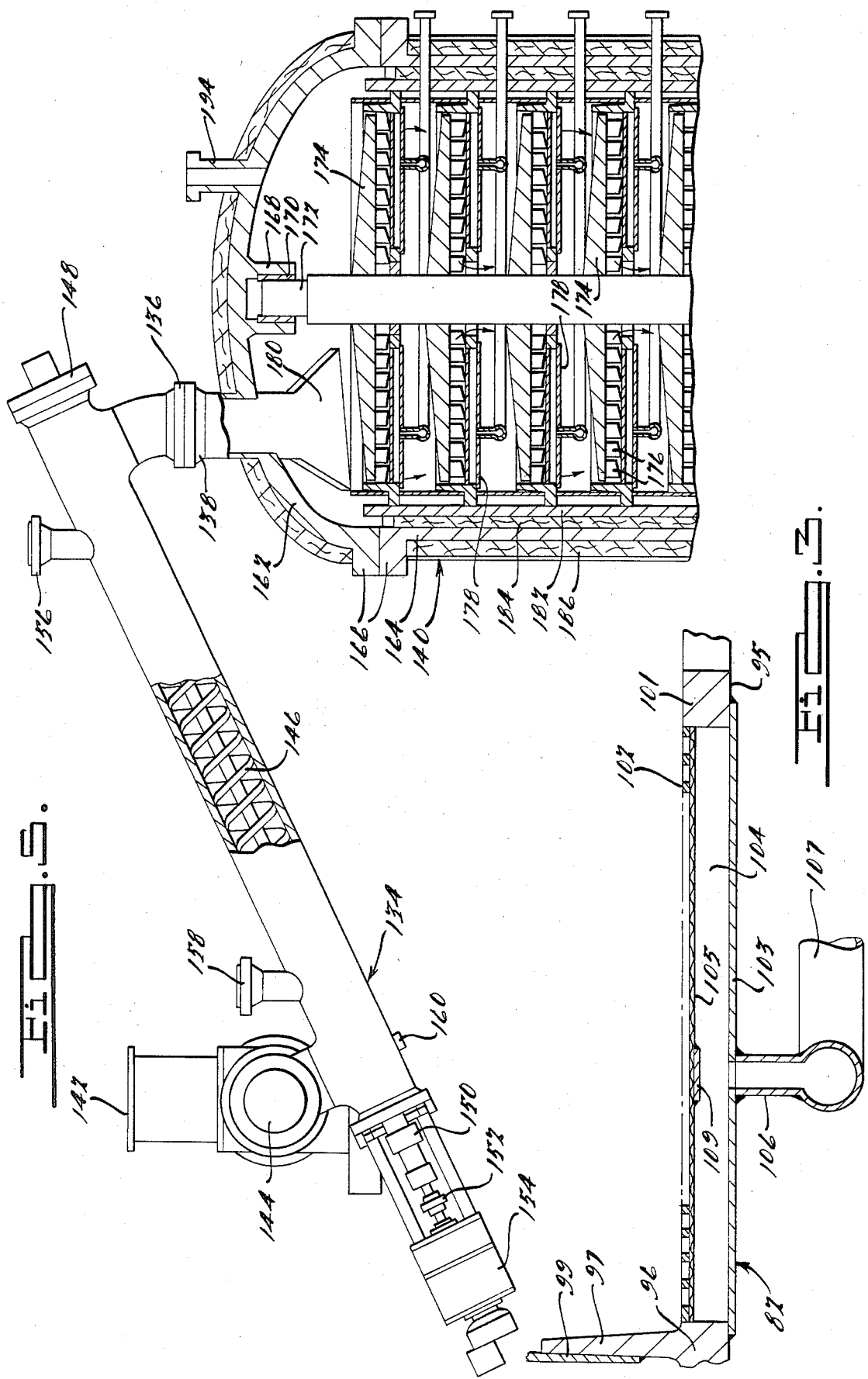

MULTIPLE HEARTH APPARATUS AND PROCESS FOR THERMAL TREATMENT OF CARBONACEOUS MATERIALS

REFERENCE TO RELATED APPLICATIONS

This application is a continuation-in-part of prior copending U.S. application Ser. No. 683,591, filed Dec. 19, 1984, now U.S. Pat. No. 4,626,258.

BACKGROUND OF THE INVENTION

The multiple hearth apparatus and process of the present invention is broadly applicable for the processing of organic carbonaceous materials containing residual moisture under controlled pressure and elevated temperatures to effect a desired physical and/or chemical modification thereof to produce a reaction product suitable for use as a fuel. More particularly, the present invention is directed to an apparatus and process by which carbonaceous materials containing appreciable quantities of moisture in the raw feed state are subjected to elevated temperature and pressure conditions whereby a substantial reduction in the residual moisture content of the solid reaction product is effected in addition to a desired thermal chemical restructuring of the organic material to impart improved physical properties thereto including an increased heating value on a dry moisture-free basis.

Shortages and increasing costs of conventional energy sources including petroleum and natural gas have occasioned investigations of alternative energy sources which are in plentiful supply such as lignitic-type coals, sub-bituminous coals, cellulosic materials such as peat, waste cullulosic materials such as sawdust, bark, wood scrap, branches and chips derived from lumbering and sawmill operations, various agricultural waste materials such as cotton plant stalks, nut shells, corn husks or the like and municipal solid waste pulp. Such alternative materials, unfortunately, in their naturally occurring state are deficient for a number of reasons for use directly as high energy fuels. Because of this, a variety of processes have heretofore been proposed for converting such materials into a form more suitable for use as a fuel by increasing their heating value on a moisture-free basis while at the same time increasing their stability to weathering, shipment and storage.

Typical of such prior art apparatuses and processes are those as described in U.S. Pat. No. 4,052,168 by which lignitic-type coals are chemically restructured by a controlled thermal treatment providing an upgraded solid carbonaceous product which is stable and resistant to weathering as well as being of increased heating value approaching that of bituminous coal; U.S. Pat. No. 4,127,391 in which waste bituminous fines derived from conventional coal washing and cleaning operations is thermally treated to provide solid agglomerated coke-like products suitable for direct use as a solid fuel; and U.S. Pat. No. 4,129,420 in which naturally occurring cellulosic materials such as peat as well as waste cellulosic materials are upgraded by a controlled thermal restructuring process to provide solid carbonaceous or coke-like products suitable for use as a solid fuel or in admixture with other conventional fuels such as fuel oil slurries. An apparatus and process for effecting an upgrading of such carbonaceous feed materials of the types described in the aforementioned United States patents is disclosed in U.S. Pat. No. 4,126,519 by which a liquid slurry of the feed material is introduced into an inclined reactor chamber and is progressively heated to form a substantially dry solid reaction product of enhanced heating value. The reaction is performed under a controlled elevated pressure and temperature in further consideration of the residence time to attain the desired thermal treatment which may include the vaporization of substantially all of the moisture in the feed material as well as at least a portion of the volatile organic constituents while simultaneously undergoing a controlled partial chemical restructuring or pyrolysis thereof. The reaction is carried out in a nonoxidizing environment and the solid reaction product is subsequently cooled to a temperature at which it can be discharged in contact with the atmosphere without combustion or degradation.

While the processes and apparatuses as described in the aforementioned United States patents have been found to provide satisfactory treatment of a variety of raw carbonaceous feed materials to produce an upgraded solid reaction product, there is a continuing need for an apparatus and process which provides for still further efficiency, versatility, simplicity and ease of control in the continuous thermal treatment of a variety of such moist raw carbonaceous feed materials providing thereby still further economies in the conversion and production of high-energy solid fuels as a replacement and alternative to conventional energy sources. The present invention comprises a further improvement in the apparatus and process as described in copending parent application Ser. No. 683,591 including a perforated hearth construction by which hot fluids can be directly injected into the reaction zone in heat transfer relationship with the feed material achieving improved efficiency in heating the feed material with a corresponding increase in the capacity of the apparatus.

SUMMARY OF THE INVENTION

The benefits and advantages of the present invention in accordance with one of the apparatus embodiments thereof are achieved by a multiple hearth apparatus comprising a pressure vessel defining a chamber containing a plurality of superimposed annular hearths including a series of upper hearths which are angularly inclined downwardly towards the periphery of the chamber defining a drying or preheating zone in which moisture and chemically combined water in the feed material is extracted. Disposed below the upper hearths, is a series of lower hearths defining a reaction zone including heating means for injecting hot fluids in heat exchange relationship with the feed material for effecting a heating thereof to a controlled elevated temperature under a controlled super atmospheric pressure for a period of time sufficient to vaporize at least a portion of the volatile substances therein and to form volatile reaction gases and a solid reaction product of enhanced heating value on a moisture-free basis. The hot reaction gases formed in the reaction zone pass upwardly in heat exchange relationship with the feed material in the drying zone in a countercurrent manner effecting at least a partial condensation of the condensible portions thereof on the incoming feed material effecting a preheating thereof by a liberation of the latent heat of vaporization and further effecting a liberation of chemically combined water in the feed material which is extracted from the angularly inclined hearths under pressure to a position exterior of the apparatus.

The apparatus is provided with a centrally extending rotatable shaft having a plurality of rabble arms thereon disposed adjacent to the upper surface of each of the hearths and are operative upon rotation thereof to effect a progressive transfer of the feed material radially along each hearth in an alternating inward and outward direction to effect a downward cascading travel of the feed material from one hearth to the next hearth therebelow. Annular baffles are preferably employed in the drying zone of the apparatus disposed above the hearths and rabble arms thereabove to confine the flow of countercurrent hot volatile reaction gases in a region immediately adjacent to the feed material on such hearths in order to enhance contact and heat transfer between the feed material and gases.

The solid reaction product is extracted from the bottom portion of the apparatus and is transferred to a suitable cooling chamber in which it is cooled to a temperature at which it can be discharged in contact with the atmosphere without adverse effects.

The apparatus is provided with an outlet in the upper portion thereof for withdrawing the volatile raction gases under pressure as a product gas which can be employed, if desired, for combustion and heating of the reaction zone of the reactor. The upper portion of the apparatus is also provided with an inlet by which the raw carbonaceous feed material or mixtures thereof are introduced through a suitable pressure lock into the reaction chamber and on to the uppermost hearth in the drying zone.

In accordance with an alternative satisfactory embodiment of the apparatus of the present invention, a drying and preheating of the feed material is effected in a first stage disposed exteriorly of the multiple hearth apparatus and the resultant preheated and partially dewatered feed material is thereafter discharged into the multiple hearth apparatus defining the reaction zone similar to the reaction zone comprising the lower portion of the composite multiple hearth apparatus as hereinbefore described. It is further contemplated in accordance with both apparatus embodiments that suitable cleaning devices such as wire brushes can be employed for removing any accumulation of encrustations from the exterior surfaces of the annular baffles to maintain optimum operating efficiency of the apparatus.

In accordance with the process aspects of the present invention, the moist organic carbonaceous feed materials are introduced into a preheating zone separate from or integrally combined with the reactor in which the feed material is preheated by the countercurrent flow of reaction gases to a temperature of from about 300° to about 500° F. Simultaneously, moisture condensing of the cool incoming feed material as well as moisture liberated in response to the heating thereof is drained from the feed material and is extracted from the preheating zone under pressure through a drain system. The feed material in a partially dewatered state passes from the preheating zone downwardly through the reaction zone and is heated to a temperature of from about 400° to about 1200° F. or higher under a pressure ranging from about 300 to about 3000 psi or higher for a period of time generally ranging from as little as about 1 minute up to about 1 hour or longer to effect a vaporization of at least a portion of the volatile substances therein forming a gaseous phase and a solid reaction product.

Additional benefits and advantages of the present invention will become apparent upon a reading of the Description of the Preferred Embodiments taken in conjunction with the drawings and the specific examples provided.

BRIEF DESCRIPTION OF THE DRAWINGS

FIG. 3 is a fragmentary vertical sectional view through an annular hearth shown in FIG. 2 and the fluid plenum disposed in communication with the perforated upper surface thereof;

FIG. 5 is a fragmentary side elevational view partly in section of a multiple hearth apparatus provided with a separate preheating and drying stage separate from the reactor section in accordance with an alternative embodiment of the present invention.

DESCRIPTION OF THE PREFERRED EMBODIMENTS

Figure 1:
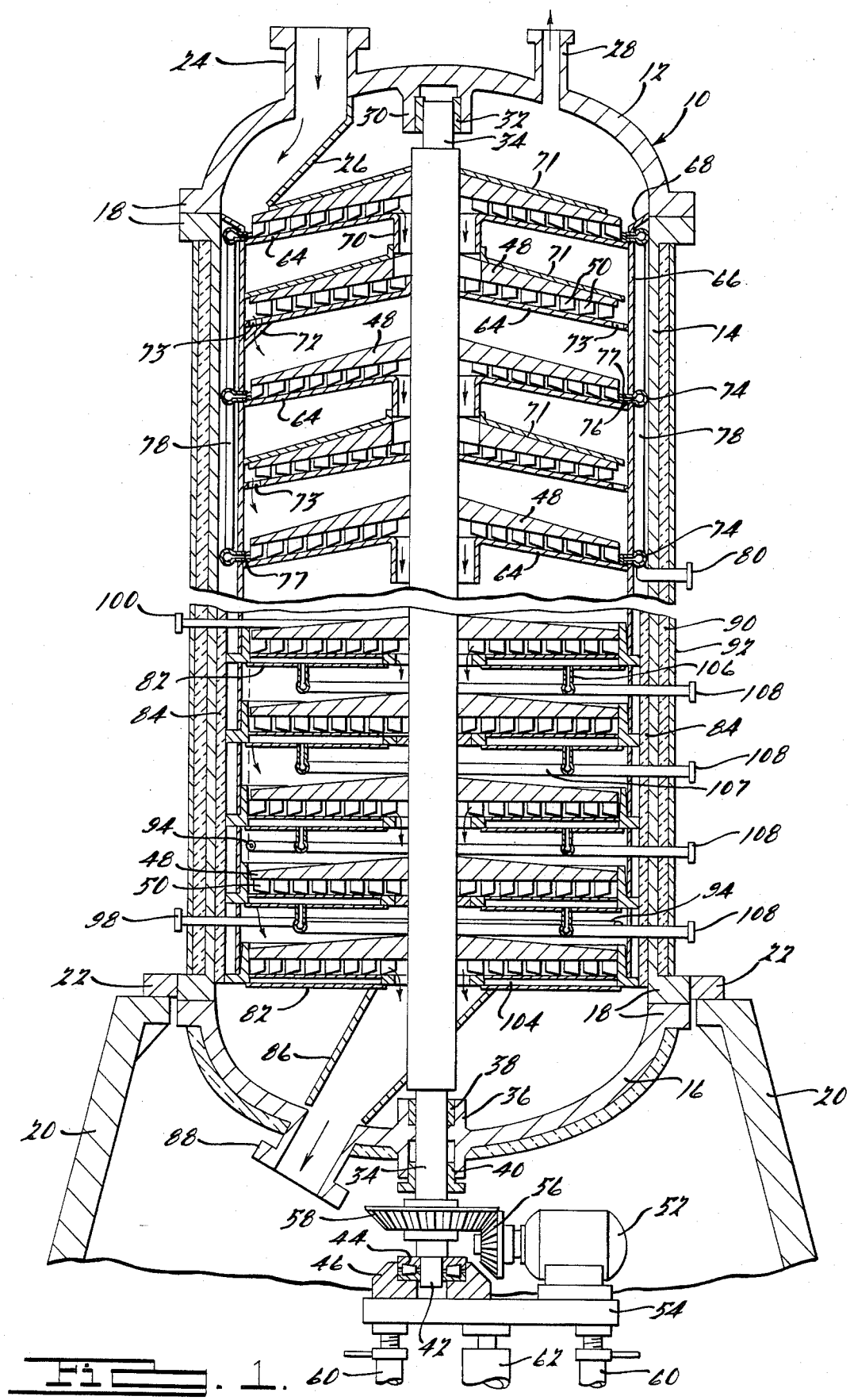
FIG. 1 is a vertical transverse sectional view through a multiple hearth apparatus constructed in accordance with the preferred embodiments of the present invention.
Figure 2:
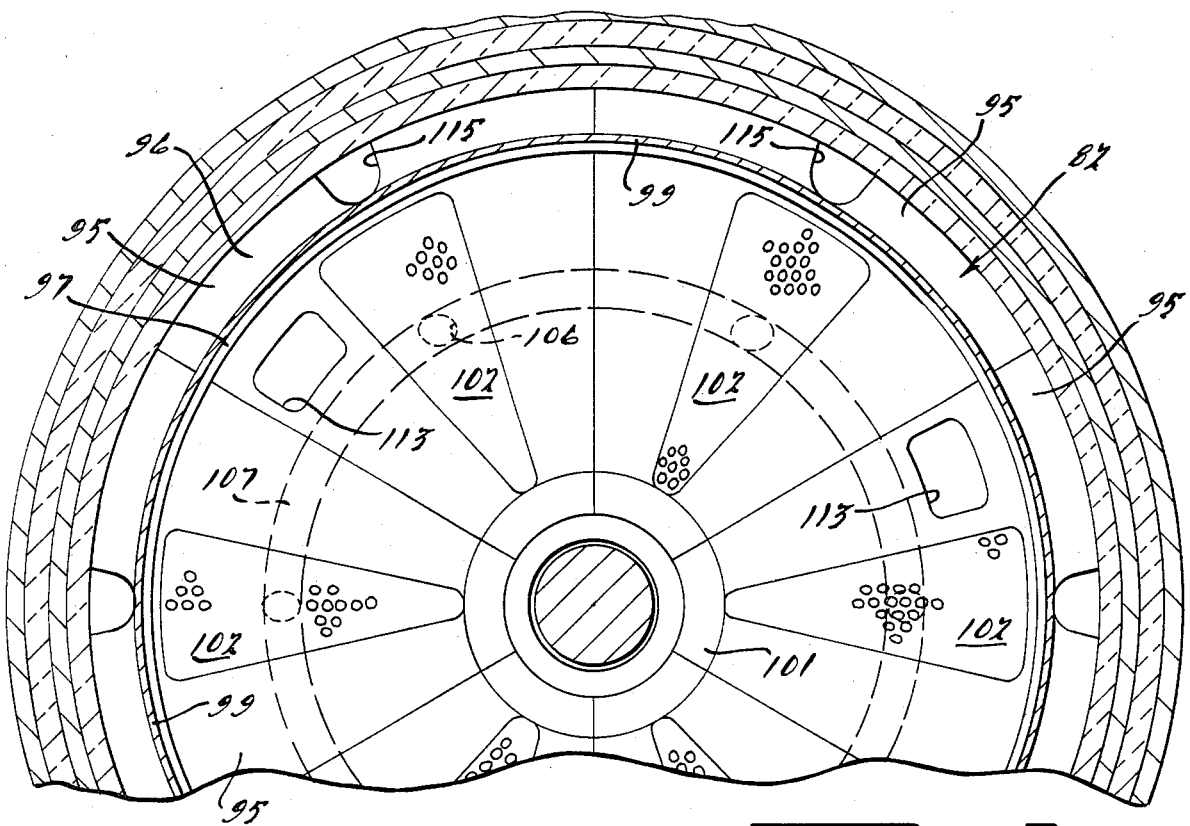
FIG. 2 is a transverse horizontal sectional view through the apparatus shown in FIG. 1 and taken through the reactor section illustrating the disposition of the perforated hearths for direct heating fluid injection.

Referring now in detail to the drawings, and as may be best seen in FIGS. 1 through 3, a multiple hearth apparatus in accordance with one of the embodiments of the present invention comprises a pressure vessel 10 comprising a dome-shaped upper portion 12, a circular cylindrical center section 14 and a dome-shaped lower portion 16 secured together in gas-tight relationship by means of annular flanges 18. The apparatus is supported in a substantially upright position by means of a series of legs 20 secured to abutments 22 connected to the lower flange 18 of the center section of the vessel. The upper domed portion 12 is provided with a flanged inlet 24 for introducing a particulated moist carbonaceous feed material into the interior of the vessel. An angular baffle 26 is provided adjacent to the inlet 24 for directionally guiding the entering feed material toward the periphery of the reaction chamber. A flanged outlet 28 is provided at the opposite side of the upper portion 12 for withdrawing volatile reaction gases under pressure from the reaction chamber in a manner subsequently to be described in further detail. A downwardly depending annular boss 30 is formed on the inner central portion of the upper portion 12 in which a bearing 32 is disposed for rotatably supporting the upper end of a rotary shaft 34.

The rotary shaft 34 extends centrally of the interior of the chamber and is rotatably journaled at its lower end in an annular boss 36 formed in the lower portion 16 by means of a bearing 38 and a fluid-tight seal assembly 40. The outward projecting end of the rotary shaft 34 is formed with a stepped stub shaft portion 42 which is seated in supported relationship within a thrust bearing 44 mounted in a bearing carrier 46.

A plurality of radially extending rabble arms 48 are affixed to and project radially from the rotary shaft 34 at vertically spaced intervals therealong. Generally, two, three or four rabble arms can be employed in the preheating or drying zone and up to six rabble arms can be employed in the reaction zone. Typically, four rabble arms disposed at approximately 90 degree increments are affixed at each level to the rotary shaft. A plurality of angularly disposed rabble teeth 50 are affixed to the lower sides of the rabble arms 48 and are angularly oriented so as to effect a radial inward and outward transfer of feed material along the multiple hearths in response to rotation of the shaft.

Rotation of the shaft 34 and the rabble arm assemblies thereon is achieved by means of a motor 52 supported on an adjustable base 54 having a bevel drive gear 56 affixed to the output shaft thereof which is disposed in constant meshing relationship with a driven bevel gear 58 affixed to the lower end portion of the shaft. The motor 52 is preferably of the variable speed type to provide controlled variations in the speed of rotation of the shaft.

In order to provide for longitudinal expansion and contraction of the shaft and variations in the vertical disposition of the rabble arms projecting therefrom in response to variations in the temperature within the multiple hearth apparatus, the base 54 and the outward projecting end of the shaft 34 are disposed on adjustable jacks 60 assisted by a fluid actuated cylinder 62 for selectively varying the height of the base 54 to assure appropriate disposition of the rabble teeth 50 relative to the upper surfaces of the hearths within the apparatus.

In accordance with the specific arrangement shown in FIG. 1, the interior of the apparatus is divided into an upper preheat or dewatering zone and a lower reaction zone. The preheating zone is comprised of a plurality of superimposed angularly inclined annular hearths 64 which slope downwardly toward the periphery of the reaction chamber. The upper preheating zone is provided with a circular cylindrical liner 66 which is radially spaced inwardly of the wall 14 of the center section and to which the angularly inclined hearths 64 are affixed. The uppermost end of the liner 66 is formed with an outwardly inclined section 68 to prevent entry of any carbonaceous feed material between the annular space between the liner and wall 14 of the center section. The uppermost hearth 64 as viewed in FIG. 1 is connected at its periphery to the liner 66 and extends upwardly and inwardly toward the rotary shaft 34. The hearth 64 terminates in a downwardly disposed circular baffle 70 which defines an annular chute through which the feed material cascades downwardly on the inner portion of the annular hearth therebelow. The downwardly inclined annular hearth 64 disposed below the uppermost hearth 64 is affixed to and supported by means of brackets 72 to the liner 66 at angularly spaced intervals therealong. The second annular hearth 64 is formed with a plurality of ports or apertures 73 around the periphery thereof through which the feed material is discharged in a cascading manner to the next hearth therebelow. In accordance with the foregoing arrangement, a moist carbonaceous feed material introduced through the inlet 24 is divered by the baffle 26 to the outer periphery of the uppermost hearth 64 and is thereafter transferred upwardly and inwardly by means of the rabble teeth 50 to a position above the circular baffle 70 whereby it drops downwardly to the hearth spaced therebelow. Similarly, the rabble teeth 50 on the second uppermost hearth are effective to transfer the feed material downwardly and outwardly along the upper surface of the hearth for ultimate discharge through the ports 73 around the periphery thereof. The feed material continues to pass downwardly in an alternating inward and outward cascading fashion as indicated by the arrows in FIG. 1 and is ultimately discharged into the lower reaction zone.

During its downward cascading travel, the feed material is subjected to contact with the countercurrent upward flow of heated volatile gases effecting a preheating thereof to a temperature generally between about 200° to about 500° F. In order to assure intimate contact of the feed material with the upwardly traveling heated gases, annular baffles 71 are disposed immediately above the rabble arms 48 over at least some of the angularly inclined hearths 64 to confine the flow of such hot reaction gases to a vicinity immediately adjacent to the upper surface of the annular hearths and in heat exchange relationship with the feed material thereon. A preheating of the feed material is achieved in part by the condensation of condensible portions of the heated gas such as steam on the surfaces of the cool incoming feed material as well as by direct heat exchange. The condensed liquids as well as the liberated chemically combined water in the incoming feed material drains downwardly and outwardly along the angularly inclined hearths and is withdrawn at the periphery of those hearths connected at their outermost ends to the circular liner through an annular gutter 74 provided with a screen 76 such as a Johnson Screen over its inlet end which is adapted to be continuously wiped by a scraper element wire brush 77 on the outermost rabble tooth on the adjacent rabble arm. The annular gutters 74 are disposed in communication with downcomers 78 disposed within the annular space between the liner 66 and wall 14 of the center section and the liquid is withdrawn from the reaction vessel through a condensate outlet 80 as shown in FIG. 1.

The cooled reaction gases passing upwardly through the preheat zone are ultimately withdrawn from the upper portion 12 of the pressure vessel through the flanged outlet 28.

The preheated and partially dewatered feed material passes from the lowermost hearth in the preheat zone to the uppermost annular hearth 82 within the reaction zone under continued controlled elevated pressure and is subjected to further heating to temperatures generally ranging from about 400° up to about 1200° F. or higher. The annular hearths 82 in the reaction zone are disposed in a substantially horizontal position, preferably of a slightly conical configuration for structural reasons, and alternating ones thereof are disposed with the periphery thereof in substantial sealing relationship against a circular cylindrical refractory lining 84 on the inside wall 14 of the center section. The rabble teeth 50 on the rabble arms 48 in the reaction zone similarly effect an alternating radial inward and radial outward movement of the feed material through the reaction zone in cascading manner as indicated by the arrows in FIG. 1. The substantially moisture free and thermally upgraded solid reaction product is discharged at the center of the lowermost hearth 82 into a conical chute 86 and is extracted from the pressure vessel through a flanged product outlet 88.

In order to further reduce loss of heat from the pressure vessel, the cylindrical section as well as the lower portion 16 is provided with an outer layer of insulation 90 of any of the types well known in the art. The center section is preferably further provided with an outer shell 92 to protect the insulation therebelow.

A heating of the feed material within the reaction zone, in accordance with an improved embodiment of the present invention, is achieved by injecting a hot fluid such as a heated gas through foraminous sections in the hearths 82 in the reaction zone. The heated gas may comprise any gas or super heated vapor possessed of adequate heat capacity to effect a heating of the feed material in the reaction zone to the desired elevated temperature. For example, the heated gas may comprise super heated steam such as derived from a combustion of the product gases extracted from the apparatus through the vent outlet 28 as shown in FIG. 1. Preferably, the heated gas comprises at least a portion of the product gas itself which is reheated and repressurized to an elevated temperature and a pressure slightly above that within the reaction zone and introduced into the feed material disposed on the hearths 82 in the reaction chamber. The product gas extracted from the apparatus is normally subjected to further processing for extracting the condensible organic constituents therein and the moisture content thereof which thereafter can be filtered and processed through a suitable heat exchanger after re-pressurization to effect a heating thereof to an elevated temperature up to about 1,200° F. or higher. Normally, a heating of the gas for injection into the reaction zone is performed at a temperature ranging from about 1,100° up to 1,150° F. to effect a heating of the feed material on the hearths within the reaction zone to a temperature of about 800° F. Pressurization of the heated gas is normally performed to provide a pressure slightly in excess of that present in the reaction zone such as, for example, a pressure of about 10 psi in excess of the internal pressure within the reaction zone. A reheating of the product gas or, in the alternative, super heated steam can be performed by utilizing an excess portion of the product gas produced including the organic constituents recovered from the apparatus. The use of recycle product gas is preferred over the use of super heated steam in that super heated steam forms a condenste in the preheating zone necessitating the extraction of excessive amounts of condensate whereas the recycle process gas produces only a minimal quantity of such condensate.

It is also contemplated, that a heating of the feed material within the reaction zone can be supplemented by auxiliary heating devices such as electrical heating elements, heat exchange tube bundles, and the like. In accordance with the embodiment as illustrated in FIG. 1, an auxiliary helical tube bundle 94 is shown which extends along the inside wall of the refractory lining 84 and is connected to a flanged inlet 98 and a flanged outlet 100 to an external supply of a heat transfer fluid such as carbon dioxide or the like. Ordinarily, the use of such auxiliary supplemental heating devices are not necessary in that the volume and temperature of the heating fluid directly injected through the hearths 82 in the reaction zone will suffice in providing optimum control of the temperature of the feed material therein.

In accordance with a preferred practice of the present invention, the foraminous hearths 82 in the reaction zone are comprised of six pie-shaped segments 95 of 60 degrees each which upon assembly form a circular hearth. As best seen in FIGS. 2 and 3, each segment 95 includes an outer annular rim 96 formed with an upstanding annular flange 97 to which a radiation shield 99 is adapted to be secured such as by welding. The inner portion of each segment 95 is formed with an annular rim 101 to which is welded an upper perforated wall 102 and a lower wall 103 defining therebetween a plenum chamber 104. As shown in FIG. 2, the perforated portion of the upper wall 102 extends only over a portion of the surface of the segment 95. Beneath the surface of the perforated wall 102 is a porous metal screen 105 which is adapted to prevent feed material disposed on the upper surface of the hearth from entering the plenum chamber 104. A feeder conduit 106 is connected to the lower wall 103 and in communication with the plenum chamber for supplying a pressurized heated gas to the interior thereof. Each segment is provided with a feeder conduit 106 which in turn is connected to an annular manifold 107 connected to a flanged inlet pipe 108 as shown in FIG. 1. A baffle 109 is preferably secured to the underside of the porous screen 106 at a location in alignment with the feeder conduit 106 as shown in FIG. 3 to provide for more uniform gas distribution through the porous section of the upper wall 102. The upper wall of each pie-shaped segment 95 is preferably provided with a port 113 in alternating hearths to permit feed material disposed thereon to fall downwardly through the port to the next hearth therebelow. Those hearths on which the feed material is transferred radially inwardly do not require such ports 113 in that the feed material is transferred downwardly over the inward edge of the inner annular rim 101 in a manner as previously described in connection with the upper hearths. As shown in FIG. 2, the outer annular rim 96 is preferably provided with a notch 115 along the outer edge thereof which is adapted to coact with vertical columns along the inner wall of the apparatus providing for support of each segment and also retain the segment in appropriate angular registry.

While the lower hearths 82 are substantially disposed in a horizontal position, it is preferred for structural considerations, to provide for a slight upward inclination forming a conical configuration which provide for greater strength and rigidity of the assembly.

Figure 4:
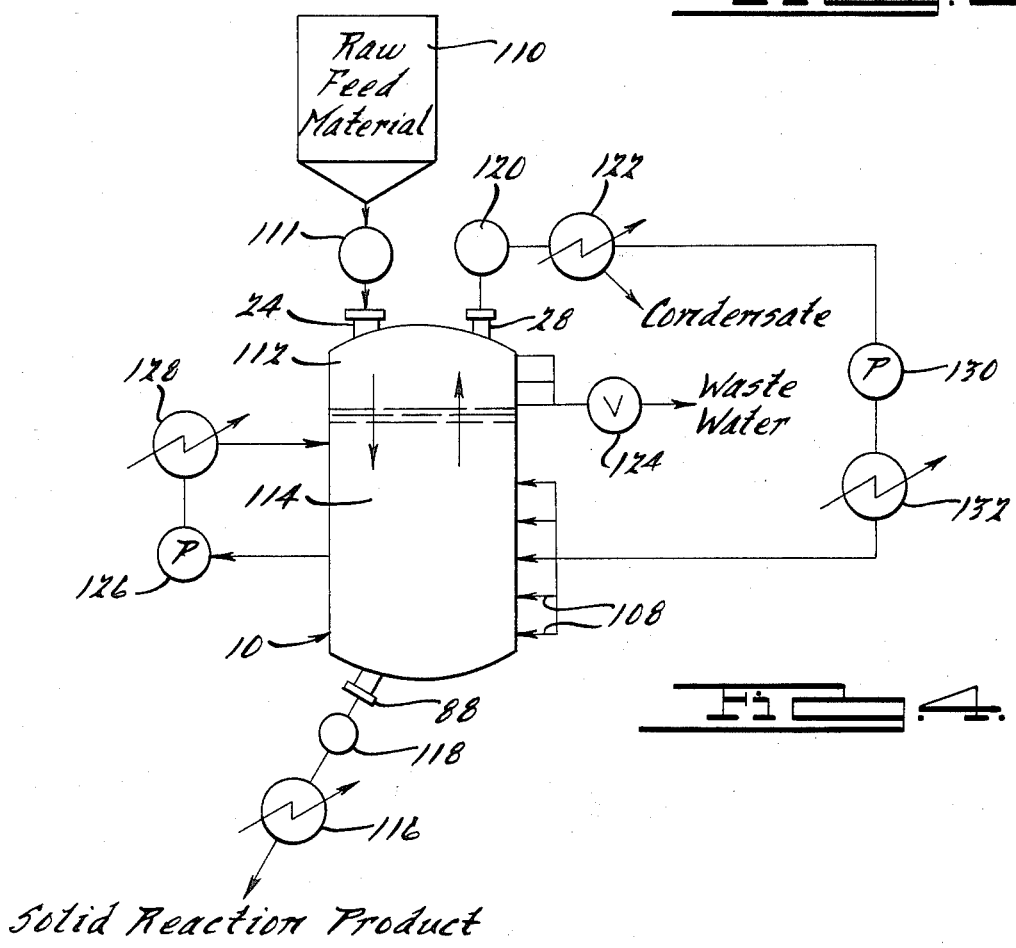
FIG. 4 is a schematic flow diagram of the apparatus and the several process streams associated in the thermal treatment of carbonaceous feed materials.

In operation and with particular reference to the flow diagram comprising FIG. 4 of the drawings, a suitable moist carbonaceous feed material is introduced from a storge hopper 110 through a suitable pressure lock 111 under pressure into the inlet 24 of the pressure vessel 10. The moist raw feed material is transferred downwardly through the upper preheat zone 112 in a manner as previously described and in heat exchange contact with the upwardly moving heated gases to effect a preheating of the feed material within a temperature generally ranging from about 200° up to about 500° F. in a manner as previously described in connection with FIG. 1. Thereafter, the preheated and partially dewatered feed material passes downwardly into the lower reaction zone 114 of the multiple hearth apparatus in which it is heated to an elevated temperature generally ranging from about 400° up to about 1200° F. to effect a controlled thermal restructuring or partial pyrolysis thereof accompanied by a vaporization of substantially all of the residual moisture therein as well as organic volatile constituents and pyrolysis reaction products. The pressure within the apparatus is generally controlled within a range of about 300 up to about 3000 psi or higher depending upon the type of feed material employed and the desired thermal restructuring thereof desired to produce the desired final solid reaction product. The number of annular hearths in the preheat zone and in the reaction zone of the apparatus is controlled depending upon the duration of treatment desired so as to provide a residence time of the material in the reaction zone which generally ranges from as little as about 1 minute up to about 1 hour or longer. The resultant thermally upgraded solid reaction product is discharged from the product outlet 88 in the lower section of the apparatus and is further cooled in a cooler 116 to a temperature at which the solid reaction product can be discharged into contact with the atmosphere without combustion or adverse effects. Generally, a cooling of the solid reaction product to a temperature less than about 500° F., and more usually temperatures below about 300° F. is adequate. The discharge conduit from the product outlet 88 is also provided with a pressure lock 118 through which the reaction product passes to prevent loss of pressure from the apparatus.

The cooled gases comprising a mixture of volatile gases evolved from the feed material and the heated gases injected into the reaction zone are withdrawn from the upper end of the reactor through the flanged outlet 28 and pass through a pressure letdown valve 120 to a condenser 122. In the condenser 122, the organic and condensible portions of the gas are condensed and extracted as by-product condensate. The noncondensible portion of the gas comprising product gas is withdrawn and all or a portion thereof can be used to supplement the heating requirements in the reaction zone. Similarly, the liquid portion extracted from the reactor in the preheating zone is withdrawn through a suitable pressure letdown valve 124 and is extracted as waste water. The waste water frequently contains valuable dissolved organic constituents and can be further processed to effect an extraction thereof or in the alternative, the waste water including the dissolved organic constituents can be directly employed for forming an aqueous slurry containing portions of the comminuted solid reaction product therein to facilitate a transportation thereof to a point remote from the reactor.

The cooled product gas from the condenser 122 in FIG. 4 can be repressurized by a pump 130 to a pressure slightly above that in the apparatus whereafter it is heated in a heat exchanger or furnace 132 to the desired elevated temperature and thereafter is introduced through the several flanged inlets to the manifold 107 (FIGS. 2 and 3) for injection through the foraminous hearths in the reaction zone. Depending upon the nature of the feed material, the fuel value of the product gas may or may not be sufficient for process heating. However, all the gas that is made is available for process heating after the circulating gas inventory has been accumulated. When super heated gas steam is employed for injection into the apparatus, all of the product gas can be immediately employed as a source of fuel in the steam generator. In this regard, all or portions of the waste water recoverd from the preheat zone can be employed for the generation of super heated steam for injection into the reaction zone.

Additionally, the flow diagram of FIG. 4 schematically depicts auxiliary heating systems for recirculating the fluid heat transfer medium through the circumferential heat exchanger section of the reaction zone 114. As shown, the circumferential heat exchange system includes a pump 126 for circulating the heat transfer fluid through a heat exchanger or furnace 128 to effect a reheating thereof and for discharge into the tube bundle in the reaction zone.

The multiple hearth reactor and process as hereinbefore shown and described is eminently adapted for processing carbonaceous materials or mixtures of such materials of the general types hereinbefore described which are generally characterized by having relatively high moisture contents in their raw feed state. The term "carbonaceous" as employed in this specification is defined as materials which are rich in carbon and may comprise naturally occurring deposits as well as waste materials generated in agricultural and forestry operations. Typically, such materials include sub-bituminous coals, lignitic-type coals, peat, waste cellulosic materials such as sawdust, bark, wood scrap, branches and chips from lumbering and sawmill operations, agricultural waste materials such as cotton plant stalks, nut shells, corn husks, rice hulls, or the like, and municipal solid waste pulp from which glass and metallic contaminants have been removed containing less than about 50 percent by weight moisture, and typically, about 25 percent by weight moisture. The multiple hearth reactor and process as herein described is eminently suitable for processing and upgrading such cellulosic materials under the conditions and processing parameters as described in U.S. Pat. Nos. 4,052,168; 4,126,519; 4,129,420; 4,127,391; and 4,477,257, the teachings of which are incorporated herein by reference.

It will be understood that the particular temperatures in the various zone of the reactor, the pressure employed and the residence time of the feed material within the several zones can be varied to achieve the requisite thermal upgrading and/or chemical restructuring of the cellulosic feed material depending upon its initial moisture content, the general chemical construction and carbon content thereof, as well as the desired characteristics of the solid reaction product recovered. Accordingly, the preheat zone of the reactor can be controlled so as to effect a preheating of the incoming feed material at room temperature to an elevated temperature generally ranging from about 200° F. up to about 500° F. whereafter upon entering the reaction zone is further heated to a temperature up to about 1200° F. or higher. The pressure within the reactor can also be varied within a range of about 300 to about 3000 psig with pressures of from about 600 to about 1500 psig being typical.

In accordance with an alternative satisfactory embodiment of the apparatus comprising the present invention, as best seen in FIG. 5, an alternative arrangement is illustrated in which the preheat zone is defined by an inclined chamber 134 which is disposed with the upper outlet end thereof connected via a flange 136 to a flanged inlet 138 of a multiple hearth apparatus 140 defining the reaction zone. The chamber 134 is provided at its lower end portion with an inlet 142 through which the moist carbonaceous feed material enters and is transferred through a screw-type feeder or lock hopper 144 under pressure into the lower end of the chamber. The carbonaceous feed material is transferred under pressure upwardly through the chamber 134 by means of a screw conveyor 146 extending the length thereof. The upper end of the screw conveyor is journaled by an end cap 148 bolted to the upper end of the chamber and at its lower end by means of a seal and bearing assembly 150 mounted on a flange bolted to the lower end of the chamber. The projecting end shaft of the screw conveyor 146 is connected by means of a coupling 152 to a variable speed electric motor 154.

The upper end of the chamber 134 is provided with a flanged outlet 56 adapted to be equipped with a rupture disk or other suitable pressure relief valve for releasing pressure from the reactor system at a preset excessive pressure level. The lower portion of the inclined chamber is provided with a second flanged outlet 158 connected by means of a suitable foraminous screen such as a Johnson-type screen in the wall of the chamber 134 through which the noncondensible gases are exhausted from the system. The flanged outlet 158 is connected in an arrangement as illustrated in FIG. 4 to a valve 120 to a product gas treatment and recovery system.

A preheating and partial dewatering of the carbonaceous material conveyed upwardly through the inclined chamber 134 is effected in response to the countercurrent flow of hot volatile gases discharged outwardly of the multiple hearth reactor 140 through the flanged inlet 138. As in the case of the embodiment described in connection with FIG. 1, a preheating of the feed material is achieved in part by the condensation of condensible portions of the heat gas such as steam on the surfaces of the cool incoming feed material as well as by direct heat exchange. A preheating of the feed material is generally effected to a temperature of from about 200° up to about 500° F. The condensed liquids and the chemically combined water liberated during the preheating and compaction of the carbonaceous material in the chamber 134 drains downwardly and is extracted from the lower portion of the chamber through a port 160 in a manner as previously described in connection with FIG. 4 equipped with a suitable valve 124 for waste water treatment and recovery. The wall of the chamber 134 adjacent to the port 160 is provided with a suitable foraminous screen such as a Johnson-type screen to minimize escape of the solid portion of the feed material.

The multiple hearth apparatus 140 as shown in FIG. 5 is of a structure similar to the apparatus illustrated in FIG. 1 with the exception that the interior of the apparatus defines a reaction zone and does not employ the angularly inclined hearths 64 as shown in FIG. 1 in the upper preheat section thereof. The reactor 140 is of similar construction and includes a dome-shaped upper portion 162 which is connected to a circular cylindrical center section 164 in gas-tight sealing relationship by means of annular flanges 166. An annular boss 168 is formed on the inner central portion of the dome-shaped portion 162 for receiving a bearing 170 in which the upper end of a rotary shaft 172 is journaled carrying a plurality of rabble arms 174 in accordance with the arrangement previously described in connection with FIG. 1. Each rabble arm is provided with a plurality of angularly disposed rabble teeth 176 for radially transferring the feed material radially inwardly and outwardly across a plurality of vertically spaced hearths 178.

In accordance with the foregoing arrangement, the preheated and partially dewatered feed material discharged from the upper end of the angularly inclined chamber 134 enters the reactor through the flanged inlet 138 equipped with a chute 180 for distributing the feed material across the uppermost hearth 178. In response to rotation of the rabble arms, the feed material passes downwardly in a cascading alternating manner as previously described and as indicated in the arrows of FIG. 5. Since the lower portion of the reactor 140 is substantially identical to that as shown in FIG. 1, no specific illustration is provided. The drive arrangement and supporting arrangement as illustrated in FIG. 1 can be satisfactorily employed for supporting the apparatus 140.

As in the case of the arrangement of FIG. 1, the apparatus 140 of FIG. 5 is provided with a cylindrical liner 182 defining the interior wall of the reaction zone which is provided with an exterior layer of insulation 184 between the wall 164. Similarly, the outer surface of the wall and dome-shaped upper portion can be provided with an insulating layer 186 to minimize heat loss.

In the embodiment illustrated in FIG. 5, the hearths 178 are of a construction similar to that previously described in connection with FIG. 1 and as more fully shown in FIGS. 2 and 3 of the drawings. A heating of the feed material in the reaction zone is achieved by the direct injection of heated gases at controlled temperatures and pressures which may be further supplemented by auxiliary optional heating devices such as the helical tube bundle 94 illustrated in FIG. 1.

It is further contemplated that after prolonged operation, an undesirable accumulation of tars and other matter may occur on the interior surfaces of the apparatus illustrated in FIGS. 1 and 5. In such event, the interior of the apparatus can be cleaned by halting the further introduction of feed material and after the last product passes through the outlet thereof, air can be introduced into the interior of the apparatus effecting oxidation and removal of the accumulated carbonaceous deposits.

In accordance with the arrangement illustrated in FIG. 5, the apparatus 140 is also preferably provided with a flanged outlet 194 in the dome-shaped upper section thereof which is adapted to be connected to a suitable rupture disk or pressure relief system in a manner similar to the outlet 156 on the chamber 134.

The operating conditions for the apparatus arrangement illustrated in FIG. 5 are substantially similar to those as previously described in connection with the apparatus of FIG. 1 to produce an upgraded, chemically restructured partially pyrolyzed product.

A typical example of the operation of the multiple hearth apparatus in accordance with the embodiment shown in FIG. 5 for upgrading a wet wood feed material will now be described. With reference to FIG. 5, the wet wood feed material enters the inlet 142 at a pressure corresponding to atmospheric pressure and at a temperature of about 60° F. The wet wood passes through the lock hopper 144 and is introduced into the lower end of the inclined chamber 14 at a pressure of 815 psi and at a temperature of about 65° F. The feed material is transferred upwardly through the chamber 134 by the screw conveyor while in countercurrent contact with heated gases from the reactor 140. The preheated wood at a temperature of about 400° F. and at a pressure of about 820 psi is transferred into the inlet 138 of the reactor apparatus. Product gas at a temperature of about 170° F. and at a pressure of about 815 psi is withdrawn from the flange outlet 158 of the chamber 134 while waste water is withdrawn from the drain port 160 at a temperature of about 400° F. at a pressure of 815 psi.

The preheated feed material is further heated by hot gas injection in the multiple hearth apparatus 140 to a desired operating temperature such as 750° F. during its downward cascading movement through the reaction zone and hot gases pass upwardly and are transferred countercurrently through the preheat chamber 134. The resultant thermally upgraded solid product is further cooled to a temperature, such as below about 200° F., after which it is transferred through a suitable lock hopper to storage at atmospheric pressure.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A multiple hearth apparatus for thermal treatment of organic carbonaceous materials under pressure comprising a pressure vessel defining a chamber containing a plurality of superimposed annular hearths including a series of upper hearths angularly inclined downwardly toward the periphery of said chamber and a series of lower hearths spaced therebelow, inlet means in the upper portion of said vessel for introducing a moist carbonaceous feed material under pressure onto the uppermost hearth, rabble means disposed above each hearth for transferring the feed material radially along each hearth in an alternating inward and outward direction to effect a downward cascading of the feed material from one hearth to the next hearth therebelow, outlet means in the upper portion of said vessel for withdrawing volatile gases under pressure from said chamber, baffle means overlying the upper hearths and rabble means for directing the upward countercurrent flow of volatile gases adjacent to the feed material and in heat transfer relationship therewith, drain means disposed in communication with said upper hearths for withdrawing any liquid thereon under pressure from said chamber, heating means in said chamber disposed in the region of the lower hearths for heating the feed material thereon to an elevated temperature for a period of time sufficient to vaporize at least a portion of the volatile substances therein to form volatile gases and a thermally restructured product, said heating means including at least one of said lower hearths formed with a foraminous upper surface disposed in communication with a plenum for discharging a heated gas into contact with the feed material on said hearth and supply means for supplying the heated gas to said plenum at a controlled elevated temperature and at a pressure above the pressure in said chamber and discharge means in the lower portion of said vessel for withdrawing the thermally restructured product under pressure from said chamber.

2. The apparatus as defined in claim 1 further including cleaning means associated with said rabble means for cleaning said drain means.

3. The apparatus as defined in claim 1 in which said lower hearths comprise a plurality of interfitting sections formed with a foraminous surface over at least a portion of the upper surface thereof.

4. The apparatus as defined in claim 1 in which said lower hearths are formed with a foraminous surface comprising an upper wall having a plurality of perforations therethrough and a porous metal screen disposed on the lower surface thereof to inhibit feed material from entering said plenum.

5. The apparatus as defined in claim 1 in which said heating means further include auxiliary heat transfer means in said chamber for supplementing a heating of the feed material by the heated gas introduced by said lower hearths.

6. The apparatus as defined in claim 1 further including means for adjustably supporting said rabble means for vertical movement relative to the upper surfaces of said upper and said lower hearths.

7. An apparatus for thermal treatment of organic carbonaceous materials under pressure comprising a preheating chamber having an inlet at one end thereof for receiving the feed material under pressure and an outlet at the other end thereof for discharging the preheated feed material, conveying means for conveying the feed material through said chamber from said inlet to said outlet, drain means in said chamber for withdrawing any liquid therein under pressure from said chamber, outlet means in the upper portion of said chamber for withdrawing volatile gases under pressure from said chamber at a position spaced from said outlet, a multiple hearth apparatus comprising a pressure vessel containing a plurality of superimposed annular hearths, inlet means in the upper portion of said vessel disposed in communication with said outlet of said chamber for introducing the preheated feed material under pressure onto the uppermost hearth, rabble means disposed above each hearth for transferring the material radially along each hearth in an alternating inward and outward direction to effect a downward cascading of the feed material from one hearth to the next hearth therebelow, heating means in said vessel for progressively heating the feed material on said hearths to an elevated temperature for a period of time sufficient to vaporize at least a portion of the volatile substances therein to form volatile gases and a thermally restructured product, said heating means including at least one annular hearth formed with a foraminous upper surface disposed in communication with a plenum for discharging a heated gas into contact with the feed material on said hearth and supply means for supplying the heated gas to said plenum at a controlled elevated temperature and at a pressure above the pressure in said vessel, means for directing the volatile gases upwardly through said vessel and through said preheating chamber in a direction countercurrent to the travel of the feed material toward said outlet means, and discharge means in the lower portion of said vessel for discharging the thermally restructured product under pressure from said apparatus.

8. The apparatus as defined in claim 7 in which said conveying means in said chamber comprises a screw-type conveyor.

9. The apparatus as defined in claim 7 in which said heating means include auxiliary heat transfer means in said vessel for supplementing a heating of the feed material by the heated gas introduced by said hearths.

10. The apparatus as defined in claim 7 in which said hearths comprise a plurality of interfitting sections formed with a foraminous surface over at least a portion of the upper surface thereof.

11. The apparatus as defined in claim 7 in which said hearths are formed with a foraminous surface comprising an upper wall having a plurality of perforations therethrough and a porous metal screen disposed on the lower surface thereof to inhibit feed material from entering said plenum.

12. The apparatus as defined in claim 7 further including means for adjustably supporting said rabble means in said apparatus for vertical movement relative to the upper surfaces of said hearths.

13. A process for the thermal treatment of moist organic carbonaceous materials under pressure which comprises the steps of:
(a) introducing a supply of moist carbonaceous material to be processed under pressure into a multiple hearth apparatus comprising a pressure vessel containing a plurality of superimposed annular hearths including a series of upper hearths angularly inclined downwardly toward the periphery of the vessel and a series of lower hearths spaced therebelow, (b) depositing the feed material onto the uppermost hearth and transferring the feed material radially along each hearth in an alternating inward and outward direction to effect a downward cascading of the feed material from one hearth to the next hearth therebelow, (c) contacting the feed material with a countercurrent flow of heated volatile gases to effect a preheating of the feed material on the upper hearths to a temperature of from about 200° up to about 500° F., (d) draining liquid from the upper hearths derived from the moisture liberated in the feed material and condensible liquids in the volatile gases under pressure from the interior of said vessel, (e) heating the preheated feed material on the lower hearths to an elevated temperature by injecting a heated gas in heat exchange contact with the feed material on at least some of the lower hearths for a period of time sufficient to vaporize at least a portion of the volatile substances therein to form volatile gases and a solid thermally restructured product, (f) withdrawing the residual volatile gases from the upper portion of said vessel and discharging the solid thermally restructured product under pressure from the lower portion of said vessel.

14. A process for the thermal treatment of moist organic carbonaceous materials under pressure which comprises the steps of:

(a) introducing a supply of moist carbonaceous feed material to be processed under pressure into a preheating chamber and preheating the feed material to a temperature of from about 200° about 500° by countercurrent heat transfer contact with heated volatile gases, (b) extracting any liquid formed in the preheating chamber from said chamber under pressure, (c) introducing the preheated feed material under pressure into a multiple hearth apparatus comprising a pressure vessel containing a plurality of superimposed annular hearths, (d) distributing the preheated feed material on the uppermost hearth and transferring the feed material radially along each hearth in an alternating inward and outward direction to effect a downward cascading of the feed material from one hearth to the next hearth therebelow, (e) heating the feed material in said apparatus to an elevated temperature by injecting a heated gas in heat exchange contact with the feed material on at least some of the annular hearths for a period of time sufficient to vaporize at least a portion of the volatile substances therein to form volatile gases and a solid thermally restructured product, (f) transferring the heated volatile gases in a countercurrent direction to the feed material through the pressure vessel and into said preheating chamber, and (g) discharging the solid thermally restructured product under pressure from said apparatus.

* * * * *